Boynton & Sweet,
Knife Handle.
No. 100,717.      Patented Mar. 15, 1870.
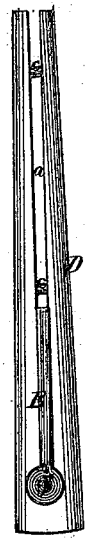
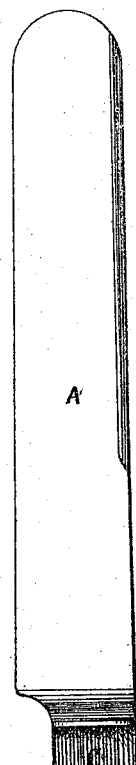
Witnesses:
Phil. F. Larner,
Adolphe Rock.
Inventors:
Leroy Boynton,
and
Wm. F. Sweet,
by Geo. W. Rothwell
Atty

United States Patent Office.

LEROY BOYNTON AND WILLIAM F. SWEET, OF JACKSON TOWNSHIP, PENNSYLVANIA.

Letters Patent No. 100,717, dated March 15, 1870.

IMPROVEMENT IN DETACHABLE HANDLES FOR KNIVES AND FORKS.

The Schedule referred to in these Letters Patent and making part of the same

*To all whom it may concern:*

Be it known that we, LEROY BOYNTON and WILLIAM F. SWEET, of Jackson township, in the county of Tioga, and State of Pennsylvania, have invented a new and useful Improvement in Detachable Handles for Knives and Forks; and we do hereby declare that the following is a full, clear, and exact description of the same, sufficient to enable others skilled in the art to which my invention appertains to make and use the same, reference being had to the accompanying drawing forming part of this specification, and in which—

Figure 1 is a view of a knife detached from the handle;

Figure 2 is a top view of a fork provided with our improved handle, one side of which is removed; and Figure 3 is a side view of the handle detached.

This invention relates especially to that class of table-cutlery provided with handles which are injured by immersion in hot water, which is necessary in cleaning the knives and forks.

Our object is to provide a detachable handle, having simple and durable fastening devices, so that, when it is required to place the knives and forks in water, the handles can be readily detached and separately cleaned, and afterward applied to the cutlery.

The invention consists in a spring catch, pivoted in a suitable recess in the handle, and so arranged as to engage automatically with a notch formed in the inner end of the tang of the knife or fork, as the tang is forced into the handle.

Our invention will be fully understood from the following detail description.

In the drawings—

A represents a knife, and B a fork, each having a similar tang or shank, C, and D is the detachable handle.

The handle may be made in one piece, as shown in fig. 3, and provided with a socket, *a*, for the tang of the knife or fork, or it may be made in two parts, secured together in any suitable manner.

The socket *a* will usually be made to extend entirely through the handle from side to side, as shown, and in this case rivets *c c* are used to strengthen the parts, and also to prevent lateral movement of the knife or fork in its handle, as will be hereinafter described.

The socket may not extend entirely through the handle at either side, and in this case the rivets *c c* will be unnecessary.

E represents the fastening-device which holds the knife or fork to its handle.

This fastening is pivoted at *i*, in a recess of the handle, and is flush with the surface of the latter.

*e* is a catch, formed at one end of the part E, adapted to engage automatically with a notch, *o*, in the inner end of the shank of the knife or fork, as the latter is forced into the recess of the handle.

On the opposite end of part E is an enlarged surface, *f*, on which pressure is exerted to release the catch *e*.

Under the part *f* is arranged a spring, *g*, in a suitable cavity.

When the handle is made as shown, that is, with a socket, *a*, extending entirely through, the rivets *c c* are inserted, as before described, and the shanks or tangs of the cutlery are made with open slots *h*, which receive the rivets as the knife or fork and the handle are brought together, as shown in fig. 2.

By this means, in connection with the spring catch, the attachment of the handle to the cutlery is made rigid.

As before stated, the rivets *c* are unnecessary when the socket *a* does not extend through the handle from side to side, and consequently the shanks C of the knives and forks are not slotted.

To apply the handle to a knife or fork, it is only necessary to insert the shank C into the socket *a*, and force the parts together until the catch *e* engages automatically with the notch *o*.

To detach the handle, pressure is exerted on the surface *f* of part E by the thumb or otherwise, and the knife or fork withdrawn.

We design so making the knives and forks that the handles may be applied indiscriminately.

The advantages of our invention will be obvious without further description.

Having thus described our invention,

What we claim as new, and desire to secure by Letters Patent, is—

A knife or fork, A or B, with a shank, C, having an open slot and notch, *o*, and a detachable handle with a spring-catch and rivets *c c*, all substantially as herein described.

To the above specification of our invention we have signed our names this 15th day of July, 1869, in the presence of two subscribing witnesses.

LEROY BOYNTON.
W. F. SWEET.

Witnesses:
S. E. KIRKENDALL,
M. K. RETAU.